(12) United States Patent
Zheng et al.

(10) Patent No.: US 9,445,093 B2
(45) Date of Patent: Sep. 13, 2016

(54) MULTIPLE ZONE SCANNING ORDER FOR VIDEO CODING

(75) Inventors: Yunfei Zheng, Cupertino, CA (US);
Xianglin Wang, San Diego, CA (US);
Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 842 days.

(21) Appl. No.: 13/536,762

(22) Filed: Jun. 28, 2012

(65) Prior Publication Data

US 2013/0083857 A1    Apr. 4, 2013

Related U.S. Application Data

(60) Provisional application No. 61/502,753, filed on Jun. 29, 2011, provisional application No. 61/554,380, filed on Nov. 1, 2011.

(51) Int. Cl.
*H04N 7/30* (2006.01)
*H04N 19/60* (2014.01)
(Continued)

(52) U.S. Cl.
CPC ...... *H04N 19/00775* (2013.01); *H04N 19/129* (2014.11); *H04N 19/17* (2014.11); *H04N 19/176* (2014.11); *H04N 19/60* (2014.11)

(58) Field of Classification Search
CPC ...... H04N 7/50; H04N 7/30; H04N 7/26244; H04N 7/2625; H04N 7/26127; H04N 19/00775; H04N 19/129; H04N 19/17; H04N 19/176; H04N 19/60
USPC .................................................. 375/240.18
See application file for complete search history.

(56) References Cited

U.S. PATENT DOCUMENTS 5,621,466 A * 4/1997 Miyane et al. ............ 375/240.2
5,714,950 A    2/1998 Jeong et al.
(Continued)

FOREIGN PATENT DOCUMENTS

JP    H08116538 A    5/1996
KR    100751869 B1    8/2007
(Continued)

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.
(Continued)

*Primary Examiner* — Shan Elahi
(74) *Attorney, Agent, or Firm* — Shumaker & Sieffert, P.A.

(57) ABSTRACT

A method for encoding transform coefficients in a video encoding process includes dividing a block of transform coefficients into a plurality of zones, determining a scan order for each of the plurality of zones, and performing a scan on each of the transform coefficients in each of the plurality of zones according to their respective determined scan order. In another example, a method for decoding transform coefficients in a video encoding process includes receiving a one-dimensional array of transform coefficients, determining a scan order for each of a plurality of sections of the one-dimensional array, wherein each section of the one-dimensional array corresponds to one of a plurality of zones defining a block of transform coefficients, and performing a scan on each of the transform coefficients in each of the section of the one dimensional array of zones according to their respective determined scan order.

38 Claims, 11 Drawing Sheets

(51) Int. Cl.
*H04N 19/176* (2014.01)
*H04N 19/129* (2014.01)
*H04N 19/17* (2014.01)

(56) References Cited

U.S. PATENT DOCUMENTS

| | | | |
|---|---|---|---|
| 5,721,544 | A | 2/1998 | Suzuki |
| 5,883,678 | A * | 3/1999 | Yamaguchi et al. ........ 348/390.1 |
| 6,795,584 | B2 | 9/2004 | Karczewicz et al. |
| 6,931,063 | B2 * | 8/2005 | Sun et al. ................ 375/240.16 |
| 7,120,307 | B2 | 10/2006 | Malvar |
| 7,684,484 | B2 * | 3/2010 | Marpe et al. ............ 375/240.12 |
| 8,204,116 | B2 * | 6/2012 | Marpe et al. ............ 375/240.12 |
| 8,787,443 | B2 * | 7/2014 | Sun et al. ..................... 375/240 |
| 2002/0066007 | A1 * | 5/2002 | Wise et al. .................... 712/300 |
| 2002/0090135 | A1 * | 7/2002 | Yamaguchi et al. .......... 382/232 |
| 2002/0163965 | A1 * | 11/2002 | Lee et al. .................. 375/240.03 |
| 2004/0066974 | A1 | 4/2004 | Karczewicz et al. |
| 2005/0163216 | A1 * | 7/2005 | Boon et al. .............. 375/240.12 |
| 2005/0259747 | A1 * | 11/2005 | Schumann ............... 375/240.25 |
| 2006/0078049 | A1 * | 4/2006 | Bao et al. ................ 375/240.11 |
| 2006/0153294 | A1 * | 7/2006 | Wang .................... H04N 19/197 375/240.08 |
| 2007/0071088 | A1 * | 3/2007 | Lee ...................... H04N 19/176 375/240.1 |
| 2007/0201550 | A1 * | 8/2007 | Wang et al. ............... 375/240.1 |
| 2007/0223580 | A1 * | 9/2007 | Ye et al. .................. 375/240.12 |
| 2007/0223825 | A1 * | 9/2007 | Ye et al. .......................... 382/240 |
| 2007/0297501 | A1 * | 12/2007 | Hussain et al. ............... 375/240 |
| 2008/0002767 | A1 * | 1/2008 | Schwarz et al. ......... 375/240.12 |
| 2008/0013622 | A1 * | 1/2008 | Bao et al. ................... 375/240.1 |
| 2008/0310504 | A1 | 12/2008 | Ye et al. |
| 2008/0310512 | A1 * | 12/2008 | Ye et al. ................... 375/240.16 |
| 2009/0097558 | A1 * | 4/2009 | Ye et al. ................... 375/240.13 |
| 2009/0175336 | A1 | 7/2009 | Karczewicz et al. |
| 2009/0226103 | A1 | 9/2009 | Choi et al. |
| 2010/0303153 | A1 * | 12/2010 | Kadono .................... 375/240.13 |
| 2011/0096834 | A1 | 4/2011 | Cheon et al. |
| 2011/0142132 | A1 * | 6/2011 | Tourapis et al. ......... 375/240.16 |
| 2011/0170594 | A1 * | 7/2011 | Budagavi et al. ........ 375/240.13 |
| 2011/0206113 | A1 * | 8/2011 | Bivolarsky et al. ..... 375/240.02 |
| 2011/0206119 | A1 * | 8/2011 | Bivolarsky et al. ..... 375/240.12 |
| 2011/0206132 | A1 * | 8/2011 | Bivolarsky et al. ..... 375/240.24 |
| 2012/0230599 | A1 * | 9/2012 | Norkin et al. ................. 382/238 |
| 2012/0328028 | A1 * | 12/2012 | Sadafale ............... H04N 19/159 375/240.24 |
| 2013/0051454 | A1 * | 2/2013 | Sze ........................ H04N 19/70 375/240.02 |
| 2013/0188688 | A1 * | 7/2013 | Panusopone ........... H04N 19/13 375/240.02 |
| 2013/0202026 | A1 * | 8/2013 | Fang ...................... H04N 19/91 375/240.02 |
| 2013/0223542 | A1 * | 8/2013 | Kim ................. H04N 19/00909 375/240.29 |
| 2013/0294501 | A1 * | 11/2013 | Sze ...................... H04N 19/463 375/240.02 |
| 2014/0029670 | A1 * | 1/2014 | Kung ............... H04N 19/00763 375/240.16 |
| 2014/0112394 | A1 * | 4/2014 | Sullivan ................. H04N 19/46 375/240.26 |

FOREIGN PATENT DOCUMENTS

| | | |
|---|---|---|
| WO | WO 9800807 A1 | 1/1998 |
| WO | WO 2004008767 A1 | 1/2004 |

OTHER PUBLICATIONS

Bross et al., "High efficiency video coding (HEVC) text specification draft 7," Joint Collaborative Team on Video Coding, JCTVC-I1003_D2, Apr. 27,-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Search Report and Written Opinion—PCT/US2012/044983—ISA/EPO—Aug. 30, 2012— 13 pp.

International Telecommunication Union, "Advanced video coding for generic audiovisual services," Standardization Sector of ITU, Jun. 2011, 674 pp.

Lee et al., "An Efficient Encoding of DCT Blocks with Block-Adaptive Scanning", IEICE Transactions on Communications, Dec. 1994, vol. E77-B, No. 12, 6 pp.

Wiegand et al.,"WD1: Working Draft 1 of High-Efficiency Video Coding", Joint Collaborative Team on Video Coding, JCTVC-C403, Oct. 7-15, 2010, 137 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al., "WD2: Working Draft 2 of High-Efficiency Video Coding", Joint Collaborative Team on Video Coding, JCTVC-D503, Jan. 20-28, 2011, 153 pp.

Marpe et al., "Context-Based Adaptive Binary Arithmetic Coding in the H.264/AVC Video Compression Standard," IEEE Transactions on Circuits and Systems for Video Technology, vol. 13, No. 7, Jul. 2003, 17 pp.

Bross et al., "High efficiency video coding (HEVC) text specification draft 6," JCTVC-H1003, Joint Collaborative Team on Video Coding (JCT-VC) of ITU-T SG16 WP3 and ISO/IEC JTC1SC29/WG11, 8th Meeting: San José, CA, USA, Feb. 1-10, 2012, 259 pp.

International Preliminary Report on Patentability—PCT/US2012/044983, The International Bureau of WIPO—Geneva, Switzerland, Oct. 10, 2013.

Wang et al., "Scans for ABT+CAVLC", JVT Meeting; Oct. 14, 2002-Oct. 18, 2002; Geneva, CH; (Joint Video Team of ISO/IEC JTC1/SC29/WG11 and ITU-T SG.16), No. JVT-E117R1, Oct. 18, 2002, XP030005531, ISSN : 0000-0432, 10 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Davies, "Unified scan processing for high efficiency coefficient coding," JCT-VC Meeting; MPEG Meeting; Jan. 20, 2011-Jan. 28, 2011; Daegu, KR; (Joint Collaborative Team on Video Coding of ITU-T SG16 WP3 and ISO/IEC JTC1/SC29/WG11); XP030008259, ISSN: 0000-0013. URL: HTTP://wftp3.itu.int/av-arch/jctvc-site/, No. JCTVC-D219, 7 pp.

Yeo et al., "Mode-Dependent Coefficient Scanning for Intra Prediction Residual Coding," JCT-VC Meeting; MPEG Meeting; Jan. 20, 2011-Jan. 28, 2011; Daegu, KR; Joint Collaborative Team on Video Coding of ITU-T SG16 WP3 and ISO/IEC JTC1/SC29/WG11); No. JCTVC-D049, XP030008090, ISSN: 0000-0015, URL: HTTP://wftp3.itu.int/av-arch/jctvc-site/, 7 pp.

Sasai et al., "Simplified Context modeling for Transform Coefficient Coding," Joint Collaborative Team on Video Coding (JCT-VC) of ITU-T SG16 WP3 and ISO/IEC JTC1/SC29/WG11, JCTVC-D185, Jan. 20-28, 2011, 5 pp.

Zheng et al., "CE11: Mode Dependent Coefficient Scanning," Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D393_r4, 6 pp.

* cited by examiner

MULTIPLE ZONE SCANNING ORDER FOR VIDEO CODING

This application claims the benefit of U.S. Provisional Application No. 61/502,753, filed Jun. 29, 2011, and U.S. Provisional Application No. 61/554,380, filed Nov. 1, 2011, the entire contents of both of which are incorporated herein by reference.

TECHNICAL FIELD

This disclosure relates to video coding, and more particularly to techniques for scanning and coding transform coefficients generated by video coding processes.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data, indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes devices and methods for coding transform coefficients associated with a block of residual video data in a video coding process. The techniques, structures and methods described in this disclosure are applicable for video coding processes that use entropy coding, such as context adaptive binary arithmetic coding (CABAC) coding, to entropy code the transform coefficients.

In one example of the disclosure, a method for encoding transform coefficients in a video encoding is proposed. The method includes dividing a block of transform coefficients into a plurality of zones, determining a scan order for each of the plurality of zones, and performing a scan on each of the transform coefficients in each of the plurality of zones according to their respective determined scan order, thereby producing a one-dimensional array of transform coefficients.

In another example of the disclosure, a method for decoding transform coefficients in a video decoding process is proposed. The method includes receiving a one-dimensional array of transform coefficients, determining a scan order for each of a plurality of sections of the one-dimensional array, wherein each section of the one-dimensional array corresponds to one of a plurality of zones defining a block of transform coefficients, and performing a scan on each of the transform coefficients in each of the section of the one dimensional array of zones according to their respective determined scan order, thereby producing the block of transform coefficients.

The details of one or more examples are set forth in the accompanying drawings and the description below. Other features, objects, and advantages will be apparent from the description and drawings, and from the claims.

DETAILED DESCRIPTION

Figure 1:
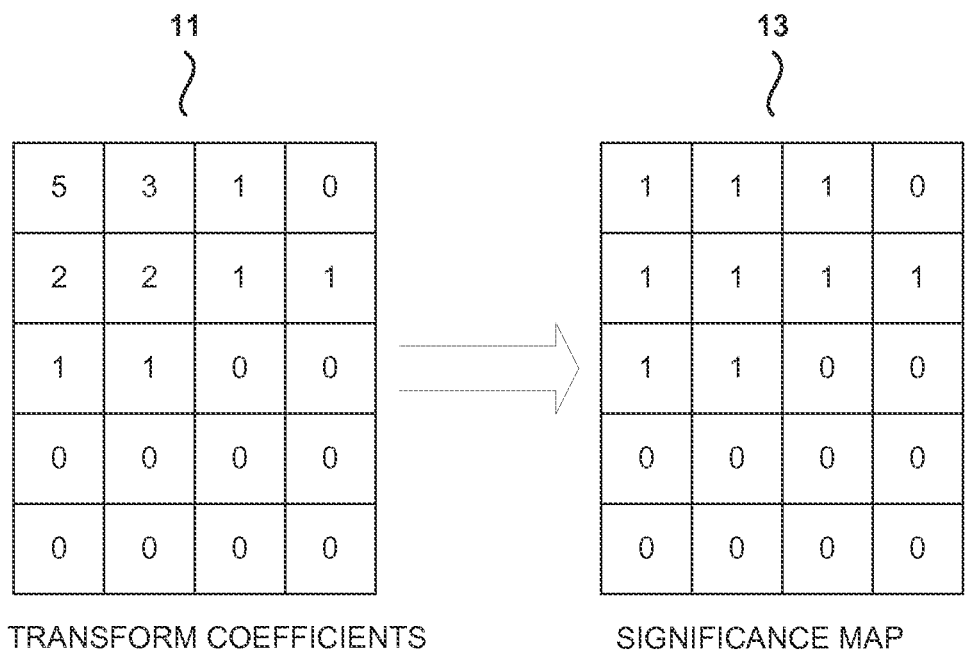
FIG. 1 is a conceptual diagram illustrating a significance map coding process.

Digital video devices implement video compression techniques to transmit and receive digital video information more efficiently. Video compression may apply spatial (intra-frame) prediction and/or temporal (inter-frame) prediction techniques to reduce or remove redundancy inherent in video sequences.

There is a new video coding standard, namely High-Efficiency Video Coding (HEVC), being developed by the Joint Collaboration Team on Video Coding (JCT-VC) of ITU-T Video Coding Experts Group (VCEG) and ISO/TEC Motion Picture Experts Group (MPEG). A recent draft of the HEVC standard, referred to as "HEVC Working Draft 6" or "WD6," is described in document JCTVC-H1003, Bross et al, "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Jun. 1, 2012, is downloadable from http://phenix.int-evry.fr/jct/doc_end_user/documents/8_San%20Jose/wg11/JCTVC-H1003-v22.zip.

For video coding according to the HEVC standard currently under development by the JCT-VC, a video frame may be partitioned into coding units. A coding unit (CU) generally refers to an image region that serves as a basic unit to which various coding tools are applied for video compression. A CU usually has a luminance component, which may be denoted as Y, and two chroma components, which may be denoted as U and V. Depending on the video sampling format, the size of the U and V components, in terms of number of samples, may be the same as or different from the size of the Y component. A CU is typically square, and may be considered to be similar to a so-called macro-block, e.g., under other video coding standards such as ITU-T H.264.

To achieve desirable coding efficiency, a CU may have variable sizes depending on video content. In addition, a coding unit may be split into smaller blocks for prediction or transform. In particular, each coding unit, may be further partitioned into one or more prediction units (PUs) and one or more transform units (TUs). Prediction units may be considered to be similar to so-called partitions under other video coding standards, such as the H.264 standard. A transform unit (TU) generally refers to a block of residual data to which a transform is applied to produce transform coefficients.

A CU usually has a luminance component, denoted as Y, and two chroma components, denoted as U and V. Depending on the video sampling format, the size of the U and V components, in terms of number of samples, may be the same as or different from the size of the Y component. The techniques of this disclosure, however, could be applicable to other standards or other types of video blocks, e.g., that could use other types of color coordinate systems.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionaily inter-coded (P) or bi-directionally inter-coded (B) with respect to blocks of reference samples in other previously-coded frames (or slices). In each case, the reference samples may be used to form a predictive block for a block to be coded.

Upon identification of a predictor, the difference between the original video data, block and its predictor is calculated. This difference is also called the prediction residual, and refers to the pixel differences between the pixels of the block to be coded and corresponding reference samples (which may be integer-precision pixels or interpolated fractional-precision pixels) of the reference block, i.e., predictor. To achieve better compression, the prediction residual (i.e., the array of pixel difference values) is generally transformed, e.g., using a discrete cosine transform (DCT), integer transform, Karhunen-Loeve (K-L) transform, or other transform.

The residual data may be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients.

To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. Entropy coding is then applied to the vector of transform coefficients. The scan of the quantized transform coefficients in a transform unit serializes the 2D array of transform coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients.

For a DCT, as an example, there is often a higher probability of non-zero coefficients toward an upper left corner (i.e., a low frequency region) of the 2D transform unit. It may be desirable to scan the coefficients in a way that increases the probability of grouping non-zero coefficients together at one end of the serialized run of coefficients, permitting zero-valued coefficients to be grouped together toward that end of the serialized vector and more efficiently coded as runs of zeros. The CABAC process or other entropy coding process, for example, may be more efficient if zero-valued coefficients to be grouped together. For this reason, scan order may be important for efficient entropy coding.

As one example, the so-called diagonal (or wavefront) scan order has been adopted for use in scanning quantized transform coefficients in the HEVC standard. Alternatively, zig-zag, horizontal, vertical or other scan orders may be used. Through transform and quantization, as mentioned above, non-zero transform coefficients are generally located at the low frequency area toward the upper left region of the block for an example in which the transform is a DCT. As a result, after the diagonal scanning process, which may traverse the upper left region first, non-zero transform coefficients are usually more likely to be located in the front portion of the 1D array. For a diagonal scanning process that traverses from the lower right region first, the non-zero transform coefficients are usually more likely to be located in the back portion of the 1D array.

A number of zero coefficients will typically be grouped at one end of the 1D array, depending on the scan direction, due to reduced energy at higher frequencies, and due to the effects of quantization, which may cause some nonzero coefficients to become zero-valued coefficients upon reduction of bit depth. These characteristics of coefficient distribution in the serialized 1D array may be utilized in entropy coder design to improve coding efficiency. In other words, if non-zero coefficients can be effectively arranged in one portion of the 1D array through some appropriate scan order, better coding efficiency can be expected due to the design of many entropy coders. For example, entropy coding may code runs of zero-valued coefficients, providing more efficient symbols for coding.

To achieve this objective of placing more non-zero coefficients at one end of the 1D array, different scan orders may be used in a video encoder-decoder (CODEC) to code transform coefficients. In some cases, diagonal scanning may be effective. In other cases, different types of scanning, such as zig-zag, vertical or horizontal scanning, may be more effective. The most desirable scan order in any given scenario may depend on various factors, such as the mode in which the video block is coded. Different directional intra-modes, for example, may result in non-zero coefficients grouped in different regions of a two-dimensional array.

Different scan orders may be produced in a variety of ways. One example is that, for each block of transform coefficients, a "best" scan order may be chosen from a number of available scan orders. A video encoder then may provide an indication to the decoder, for each block, an index of the best scan order among a set of scan orders denoted by respective indices. The selection of the best scan order may be determined by applying several scan orders and selecting one that is most effective in placing nonzero coefficients near the beginning or end of the 1D vector, thereby promoting efficient entropy coding.

In another example, the scan order for a current block may be determined based on various factors relating to the coding of the pertinent prediction unit, such as the prediction mode (I, B, P), block size, transform or other factors. In some cases, because the same information, e.g., prediction mode, can be inferred at both the encoder and decoder side, there may be no need to provide an indication of the scan order index to the decoder. Instead, the video decoder may store configuration data that indicates the appropriate scan order given knowledge of the prediction mode for a block, and one or more criteria that maps a prediction mode to a particular scan order.

To further improve coding efficiency, the available scan orders may not be constant all of the time. Instead, some adaptation may be enabled so that the scan order is adaptively adjusted, e.g., based on coefficients that are already coded. In general, the scan order adaptation may be done in such a way that, according to the selected scan order, zero and non-zero coefficients are more likely to be grouped together. Scan orders may adapt based on statistics associated with similar types of video blocks. The scan order may adapt based on counts of non-zero coefficients in each coefficient location, e.g., in similar types of video blocks previous coded. Also, with some adaption techniques, the coefficient order within the scan (for two successive coefficients within the scan) may swap locations based on the values (or significance) of such coefficients in video blocks previous coded.

In some video CODECs, the initial available scan orders may be in a very regular form such as purely horizontal, vertical, diagonal, or zig-zag scan. Alternatively, the scan orders may be derived through a training process and therefore may appear to be somewhat random. The training process may involve application of different scan orders to a block or series of blocks to identify a scan order that produces desirable results, e.g., in terms of efficient placement of nonzero and zero-valued coefficients, as mentioned above.

If a scan order is derived from a training process, or if a variety of different scan orders can be selected, it may be beneficial to save the particular scan orders at both the encoder and decoder side. The amount of data specifying such scan orders can be substantial. For example, for a 32×32 transform block, one scan order may contain 1024 transform coefficient positions. Because there may be differently sized blocks and, for each size of transform block, there may be a number of different scan orders, the total amount of data that needs to be saved is not negligible. Regular scan orders such as diagonal, horizontal, vertical or zig-zag order may not require storage, or may require minimal storage. However, diagonal, horizontal, vertical or zig-zag orders may not provide sufficient variety to provide coding performance that is on par with trained scan orders.

In one example, for H.264 and the HEVC standard presently under development, when the CABAC entropy coder is used, the positions of the significant coefficients (i.e., nonzero transform coefficients) in the transform block (i.e., transform unit in HEVC) are encoded prior to the levels of the coefficients. The process of coding the locations of the significant coefficients is called significance map coding. As shown in FIG. 1, significance map coding of the quantized transform coefficients 11 produces a significance map 13. The significance map 13 is a map of ones and zeros, where the ones indicate locations of significant coefficients. The significance map typically requires a high percentage of the video bit-rate.

An example process for coding a significance map is described in D. Marpe, H. Schwarz, and T. Wiegand "Context-Based Adaptive Binary Arithmetic Coding in the H.264/ AVC Video Compression Standard," IEEE Trans, Circuits and Systems for Video Technology, vol. 13, no. 7, July 2003. In this process, the significance map is coded if there is at least one significant coefficient in the block, as indicated by the Coded Block Flag (CBF), which is defined as:

Coded Block Flag: coded_block_flag is a one-bit symbol, which indicates if there are significant, i.e., nonzero coefficients inside a single block of transform, coefficients, for which the coded block pattern indicates nonzero entries. If coded_block_flag is zero, no further information is transmitted for the related block.

If there are significant coefficients in the block, the significance map is encoded by following a scan order of transform coefficients in the block as follows:

Scanning of Transform. Coefficients: two-dimensional arrays of transform coefficient levels of sub-blocks for which the coded_block_flag indicates nonzero entries are first mapped into a one-dimensional list using a given scanning pattern. In other words, sub-blocks with significant coefficients are scanned according to a scanning pattern.

Given the scanning pattern, the significance map is scanned as follows:

Significance Map: If the coded_block_flag indicates that a block has significant coefficients, a binary-valued significance map is encoded. For each transform coefficient in the scanning order, a one-bit symbol significant_coeff_flag is transmitted. If the significant_coeff_flag symbol is one, i.e., if a nonzero coefficient exists at this scanning position, a further one-bit symbol last_significant_coeff_flag is sent. This symbol indicates if the current significant coefficient is the last one inside the block or if further significant coefficients follow. If the last scanning position is reached and the significance map encoding was not already terminated by a last_significant_coeff_flag with value one, it is apparent that the last coefficient has to be significant.

Figure 2:
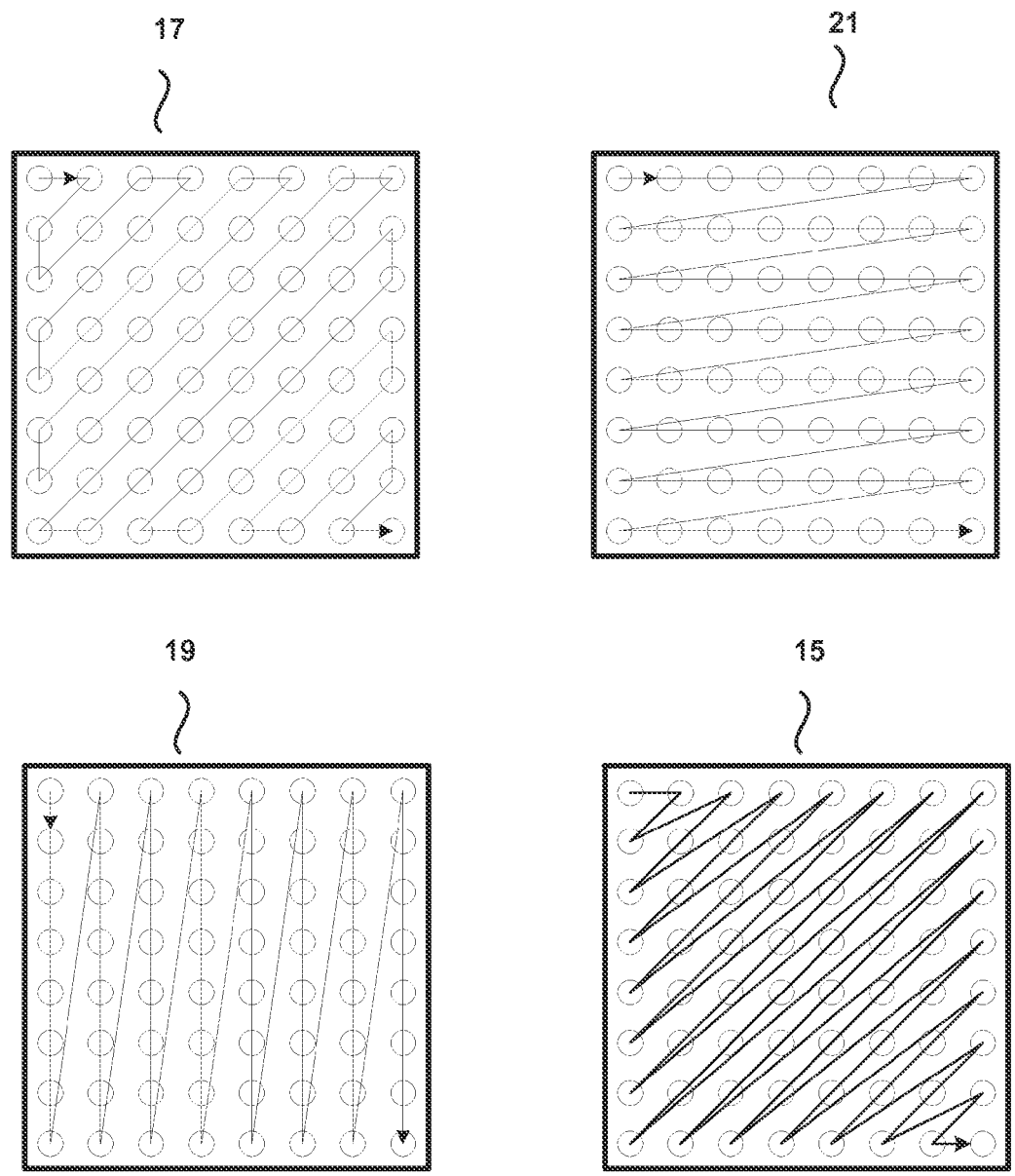
FIG. 2 is a conceptual diagram illustrating scanning patterns and directions for significance map coding.

Currently, in HEVC, it is proposed that three scan patterns be used for the significance map: diagonal, vertical, and horizontal. FIG. 2 shows an example of a zig-zag scan 17, a vertical scan 19, a horizontal scan 21, and a diagonal scan 15. As shown in FIG. 2, each of these scans proceeds in a forward direction, i.e., from lower frequency transform coefficients in the upper left corner of the transform block to the higher frequency transform coefficients in the lower right corner of the transform block. Alternatively, each of the scans in FIG. 2 may proceed in an inverse direction (i.e., from the lower right corner of the block to the upper left corner). After the significance map is coded, the level information for each transform coefficient (i.e., the coefficient value and its sign) is coded.

As shown in FIG. 2, the forward horizontal and vertical scans will scan one row/column from left or top all the way to the right or bottom, then go back to the left or top for next row/column. This kind of "strong" scanning order may not be efficient for large blocks, as there is often little correlation between the transform coefficients at the end of one row/column and the beginning of the next/row column.

This disclosure describes several different features that may reduce or eliminate some of the drawbacks described above. In general, this disclosure proposes a multiple zone scanning process for scanning transform coefficients in an entropy coding process. The following description will describe this multiple zone scanning process in terms of significance map scanning for CABAC. However, the disclosed process may be applicable for any process for scanning transform coefficients in CAVLC, PIPE or CABAC (e.g., for absolute level and sign coding).

This disclosure proposes techniques for encoding residual transform coefficients in a video encoding process. The techniques include dividing a block of residual transform coefficients into a plurality of zones, determining a scan order for each of the plurality of zones, and performing a scan on each of the transform coefficients in each of the plurality of zones according to their respective determined scan order, thereby producing a one-dimensional array of residual transform coefficients.

This disclosure also proposes techniques for decoding residual transform coefficients in a video encoding process. The techniques include receiving a one-dimensional array of residual transform coefficients, determining a scan order for each of a plurality of sections of the one-dimensional array, wherein each section of the one-dimensional array corresponds to one of a plurality of zones defining a block of residual transform coefficients, and performing a scan on each of the transform coefficients in each of the section of the one dimensional array of zones according to their respective determined scan order, thereby producing the block of residual transform coefficients.

Figure 3:
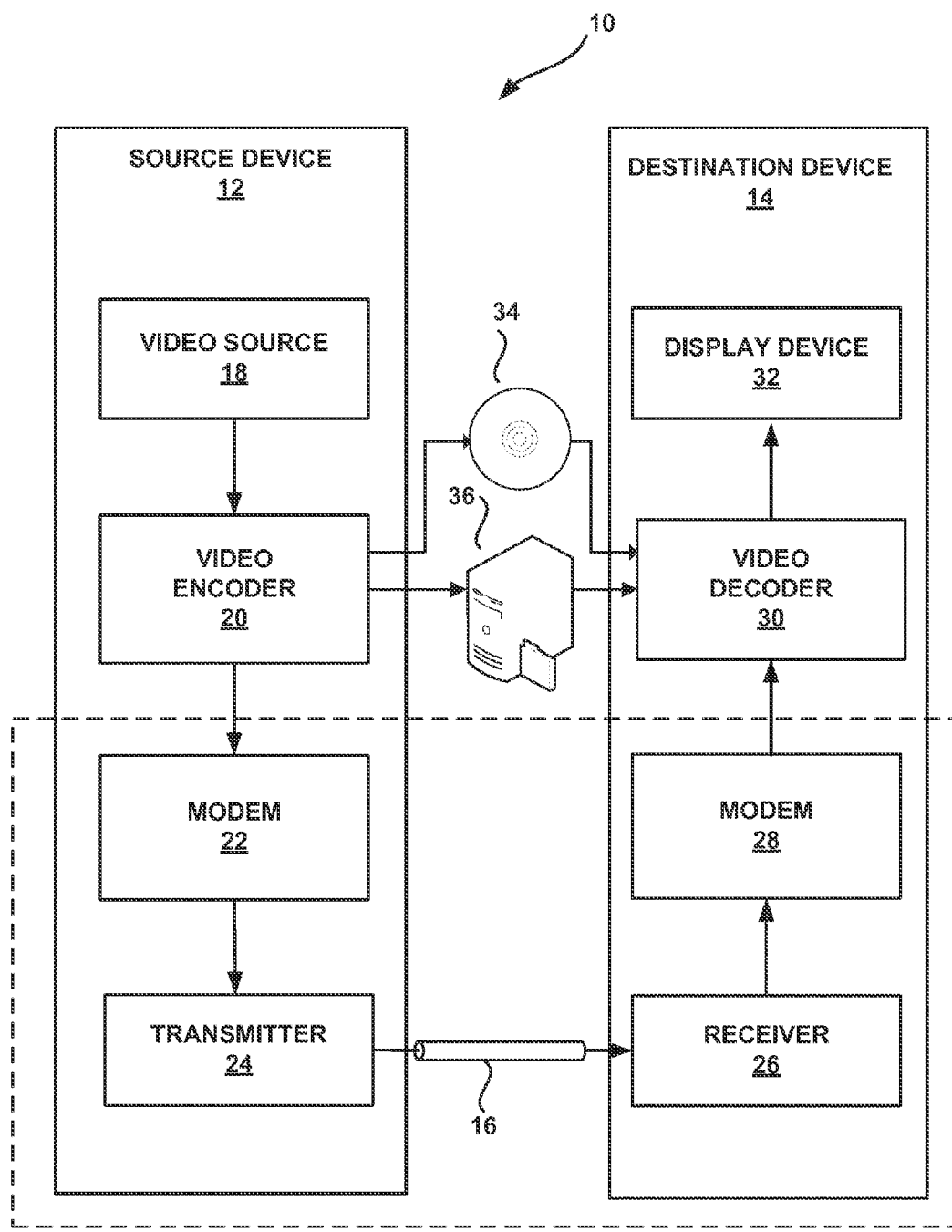
FIG. 3 is a block diagram illustrating an example video coding system.

FIG. 3 is a block diagram illustrating an example video encoding and decoding system 10 that may be configured to utilize techniques for coding transform coefficients in accordance with examples of this disclosure. As shown in FIG. 3, the system 10 includes a source device 12 that transmits encoded video to a destination device 14 via a communication channel 16. Encoded video may also be stored on a storage medium 34 or a file server 36 and may be accessed by the destination device 14 as desired. The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, mobile devices, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data, connection, including an Internet connection. This may include a wireless channel (e.g., a. Wi-Fi connection), a wired connection (e.g., DSL, cable modem, etc.), or a combination of both that is suitable for accessing encoded video data stored on a file server.

Techniques for coding transform coefficients, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 3, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 3, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 3, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 3, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure to improve encoding of transform coefficients in a video coding process. Likewise, the video decoder 30 may implement any or all of these techniques to improve decoding of transform coefficients in a video coding process. A video coder, as described in this disclosure, may refer to a video encoder or a video decoder. Similarly, a video coding unit may refer to a video encoder or a video decoder. Likewise, video coding may refer to video encoding or video decoding.

The video encoder 20 may be configured to perform a method for encoding residual transform coefficients in a video encoding process comprising dividing a block of residual transform coefficients into a plurality of zones, determining a scan order for each of the plurality of zones, and performing a scan on each of the transform coefficients in each of the plurality of zones according to their respective determined scan order, thereby producing a one-dimensional array of residual transform coefficients.

The video decoder 30 may be configured to perform a method for decoding residual transform coefficients in a video decoding process comprising receiving a one-dimensional array of residual transform coefficients, determining a scan order for each of a plurality of sections of the one-dimensional array, wherein each section of the one-dimensional array corresponds to one of a plurality of zones defining a block of residual transform coefficients, and performing a scan on each of the transform coefficients in each of the section of the one dimensional array of zones according to their respective determined scan order, thereby producing the block of residual transform coefficients.

Figure 4:
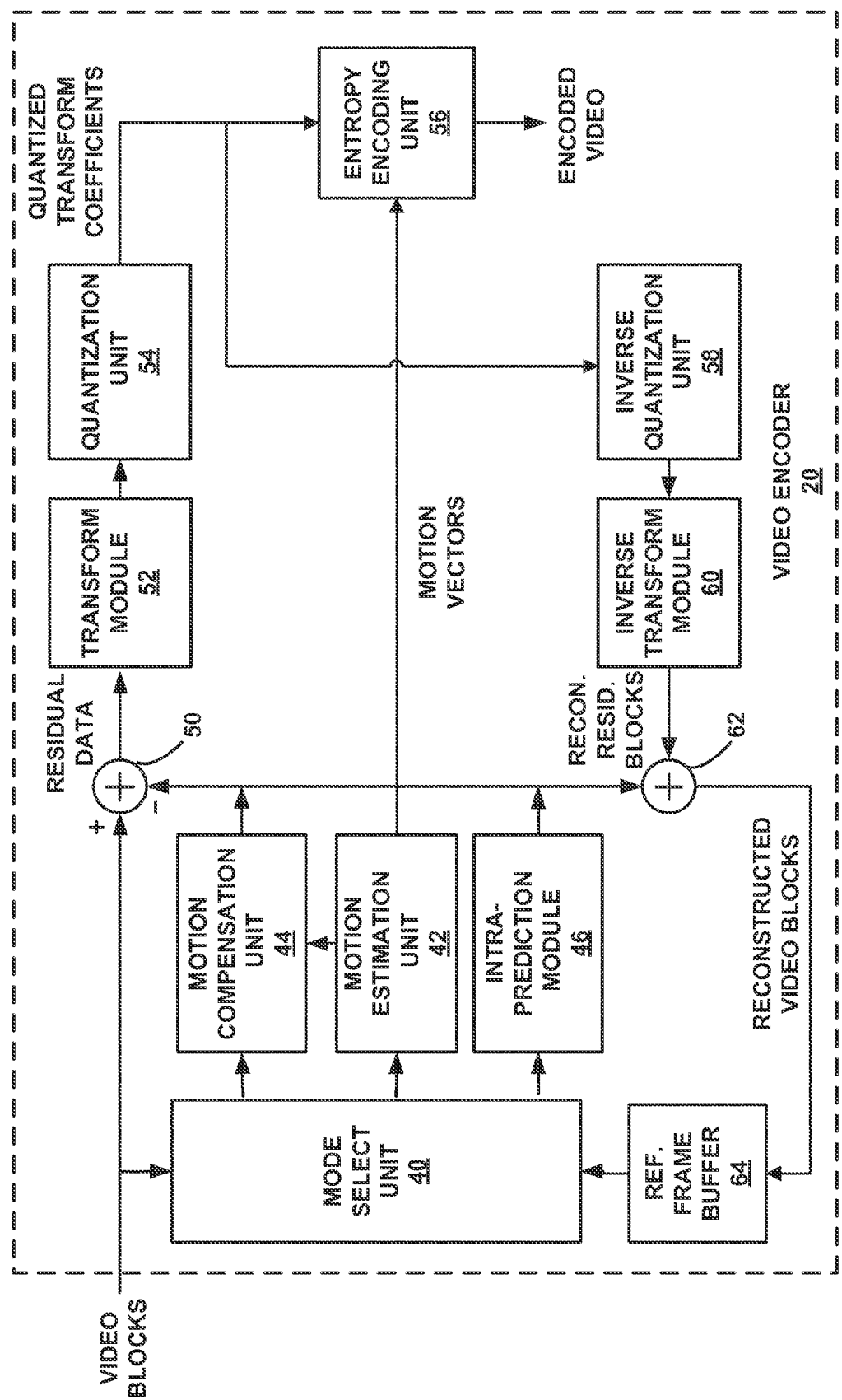
FIG. 4 is a block diagram illustrating an example video encoder.

FIG. 4 is a block diagram illustrating an example of a video encoder 20 that may use techniques for coding transform coefficients as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 4, the video encoder 20 receives a current video block within a video frame to be encoded. In the example of FIG. 4, the video encoder 20 includes a motion compensation unit 44, a motion estimation unit 42, an intra-prediction module 46, a reference frame buffer 64, a summer 50, a transform module 52, a quantization unit 54, and an entropy encoding unit 56. The transform module 52 illustrated in FIG. 4 is the unit that applies the actual transform to a block of residual data, and is not to be confused with block of transform coefficients, which also may be referred to as a transform unit (TU) of a CU. For video block reconstruction, the video encoder 20 also includes an inverse quantization unit 58, an inverse transform module 60, and a summer 62. A deblocking filter (not shown in FIG. 4) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction module 46 may perform intra-predictive coding of the received video block relative to one or more neighboring blocks in the same frame or slice as the block to be coded to provide spatial compression.

The mode select unit 40 may select one of the coding modes, intra or inter, e.g., based on rate distortion analysis for each mode, and provides the resulting intra- or inter-coded block to the summer 50 to generate residual block data and to the summer 62 to reconstruct the encoded block for use in a reference frame. Some video frames may be designated as I-frames, where all blocks in an I-frame are encoded in an intra-prediction mode. In some cases, the intra-prediction module 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of square difference (SSD), or other difference metrics. Motion compensation, performed by the motion compensation unit 44, may involve fetching or generating values for the prediction unit based on the motion vector determined by motion estimation. Again, the motion estimation unit 42 and the motion compensation unit 44 may be functionally integrated, in some examples.

The motion estimation unit 42 calculates a motion vector for a prediction unit of an inter-coded frame by comparing the prediction unit to reference samples of a reference frame stored in the reference frame buffer 64. In some examples, the video encoder 20 may calculate values for sub-integer pixel positions of reference frames stored in the reference frame buffer 64. For example, the video encoder 20 may calculate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision. The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction module 46 may intra-prediction encode the received block, as an alternative to inter-prediction performed by the motion estimation unit 42 and the motion compensation unit 44. The intra-prediction module 46 may encode the received block relative to neighboring, previously coded blocks, e.g., blocks above, above and to the right, above and to the left, or to the left of the current block, assuming a left-to-right, top-to-bottom encoding order for blocks. The intra-prediction module 46 may be configured with a variety of different intra-prediction modes. For example, the intra-prediction module 46 may be configured with a certain number of directional prediction modes, e.g., 33 directional prediction modes, based on the size of the CU being encoded.

The intra-prediction module 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for ail pixel positions in the PU have been calculated, the intra-prediction module 46 may calculate an error value for the prediction mode based on pixel differences between the PU and the received block to be encoded. The intra-prediction module 46 may continue testing intra-prediction modes until an intra-prediction mode that yields an acceptable error value is discovered. The intra-prediction module 46 may then send the PU to the summer 50.

The video encoder 20 forms a residual block by subtracting the prediction data calculated by the motion compensation unit 44 or the intra-prediction module 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform module 52 may form one or more transform units (TUs) from the residual block. The transform module 52 applies a transform, such as a discrete cosine transform (OCT), a directional transform, or a conceptually similar transform, to the TU, producing a video block comprising transform coefficients. The transform module 52 may send the resulting transform coefficients to the quantization unit 54. The quantization unit 54 may then quantize the transform coefficients. The entropy encoding unit 56 may then perform a scan of the quantized transform coefficients in the matrix according to a specified scan order. This disclosure describes the entropy encoding unit 56 as performing the scan. However, it should be understood that, in other examples, other processing units, such as the quantization unit 54, could perform the scan.

Figure 5:
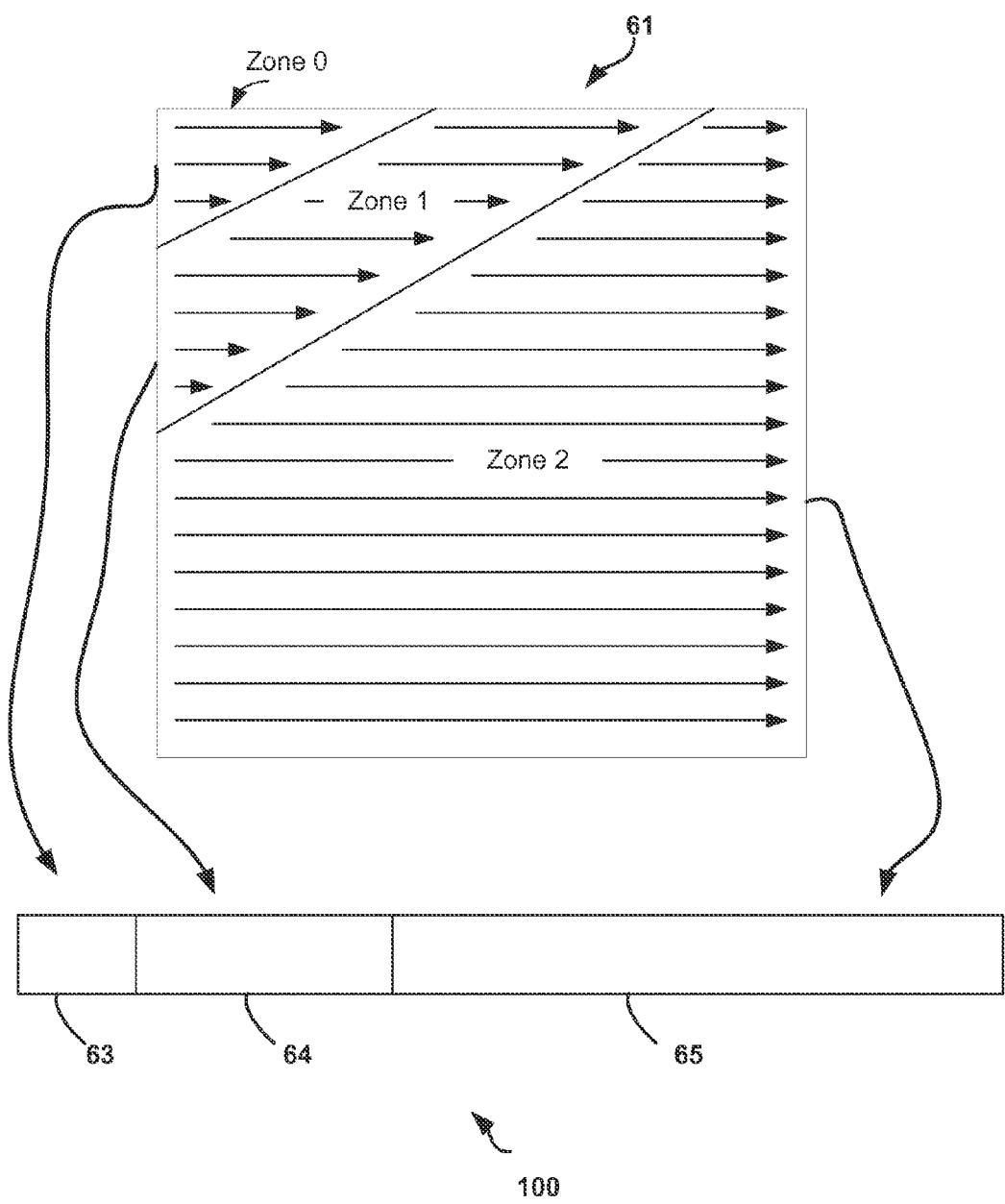
FIG. 5 is a conceptual diagram illustrating a multiple zone scanning process used in video encoding.
Figure 6:
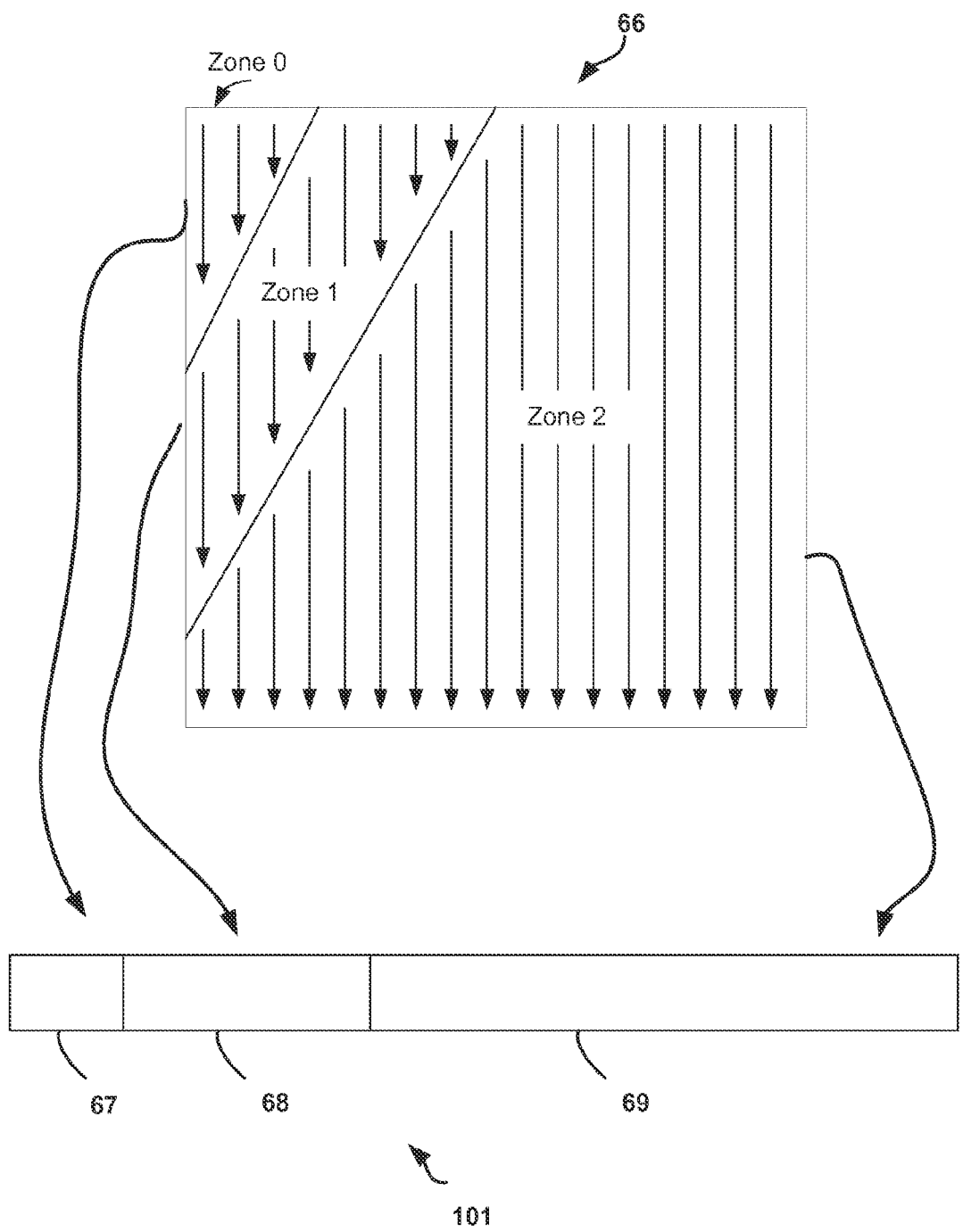
FIG. 6 is another conceptual diagram illustrating a multiple zone scanning process used in video encoding.

Rather than scanning a block of residual transform coefficients as a whole, this disclosure proposes using a multiple zone scanning order. FIGS. 5 and 6 show examples of multiple frequency zone scanning in accordance with the techniques of this disclosure. Referring to FIG. 5, block of transform coefficients 61 may be divided into multiple frequency zones (zone 0, zone 1, and zone 2). A block of transform coefficients may be generally thought of as a map of power of the transformed signal in the frequency domain. In general, the upper left corner of the block represents the power in lower frequencies, including the DC component, and the lower right corner of the block represents the power in the higher frequencies. Typically, most of the power of a signal is contained within the lower frequency portion of a block. By dividing the block into multiple frequency zones and then scanning the transform coefficients in each zone together, the relative correlation of transform coefficients in each frequency zone of a block can be better exploited, thus providing for better entropy coding efficiency. In some examples, the zones may be referred to as "sub-blocks" of a TU (e.g., sub-units of a TU leaf node).

All transform coefficients in a particular frequency zone are scanned before scanning transform coefficients in any other frequency zone. As shown in FIG. 5, the scan order within each zone is a horizontal scan. The scan of the entire block 61 would proceed from zone to zone, where the transform coefficients in each zone are scanned together. One example scanning order is as follows:

Zone to zone order: scan zone 0→scan zone 1→scan zone 2

The transform coefficients within each zone are scanned into corresponding sections of a one-dimensional array 100. As shown in FIG. 5, transform coefficients from zone 0 are scanned into section 63, transform coefficients from zone 1 are scanned into section 64, and transform coefficients in zone 2 are scanned into section 65. The sections of the one-dimensional array 100 that correspond to particular zones of block 61 may be dependent on the zone to zone order. That is, consecutive sections of one-dimensional array 100 may correspond to consecutive zones in block 61 according to the zone to zone scan order.

FIG. 6 shows another example of multiple frequency zone scanning. The block of transform coefficients 66 may be divided into multiple frequency zones (zone 0, zone 1, and zone 2). As shown in FIG. 6, the scan order within each zone is a vertical scan. The transform coefficients within each zone are scanned into corresponding sections of a one-dimensional array 101. The transform coefficients from zone 0 are scanned into section 67, transform coefficients from zone 1 are scanned into section 68, and transform coefficients in zone 2 are scanned into section 69. The sections of the one-dimensional array 101 that correspond to particular zones of block 66 may be dependent on the zone to zone order. That is, consecutive sections of one-dimensional array 101 may correspond to consecutive zones in block 66 according to the zone to zone scan order.

FIGS. 5 and 6 show examples where a block of residual transform coefficients are divided into three frequency zones. However, the techniques of this disclosure are applicable for any number of zones two or larger. The number of zones can be based on block size, prediction mode, motion information, or other video coding characteristics.

The example of FIGS. 5 and 6 shows that the scan order within each zone is identical. In other examples, the scan order used for each zone may be different, and individually selected. The scan order for each zone may be any scan order (e.g., zig-zag, horizontal, vertical, diagonal, adaptive, combinations of these, or another pre-defined or adjustable scan order). The scan order from zone to zone may be defined differently based on the block size, prediction mode, and/or motion information. Furthermore, the scan order in each zone need not proceed in a forward direction (i.e., from the upper left of the block/zone to the lower right of the block/zone). For example, an inverse scan direction (i.e., from the lower right of the block/zone to the upper left of the block/zone) could be used for some zones.

The shape and boundary of each zone can be defined based on block size, prediction mode, and motion information. For example, the size and angle of each zone boundary may be a preset determination based on the size of the block and the prediction mode (e.g., inter-prediction, horizontal intra-prediction, vertical prediction, etc.) used. As such, the shape and boundary of each zone may be inferred by a video decoder. In other examples, the size and shape of each zone may be signaled in the encoded video bitstream.

As one example, for horizontal scanning as shown in FIG. 5, each zone boundary forms a 30 degree angle to the top line of the block of transform coefficients. The top intersection of the zone 0 boundary and the top line of the block is the maximum of 6 or (W/4+2), where W is the width of the block. The top intersection of the zone 1 boundary and the top line of the block is the minimum of (W/2+4) or W. In this example, 6 is the minimum block width applicable for use with this technique.

For the vertical scanning example in FIG. 6, each zone boundary forms a 60 degree angle to the top line of the block of transform coefficients. The top intersection of the zone 0 boundary and the top line of the block is the maximum of 6 or (H/4+2), where H is the height of the block. The top intersection of the zone 1 boundary and the top line of the block is the minimum of (H/2+4) or H. In this example, 6 is the minimum block height applicable for use with this technique.

Returning to FIG. 4, once the transform coefficients are scanned, the entropy encoding unit 56 may apply entropy coding such as CAVLC, PIPE, or CABAC to the coefficients. In addition, the entropy encoding unit 56 may encode motion vector (MV) information and any of a variety of syntax elements useful in decoding the video data at the video decoder 30. The syntax elements may include a significance map with significant coefficient flags that indicate whether particular coefficients are significant (e.g., non-zero) and a last significant coefficient flag that indicates whether a particular coefficient is the last significant coefficient. The video decoder 30 may use these syntax elements to reconstruct the encoded video data. Following the entropy coding by the entropy encoding unit 56, the resulting encoded video may be transmitted to another device, such as the video decoder 30, or archived for later transmission or retrieval.

The inverse quantization unit 58 and the inverse transform module 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 7:
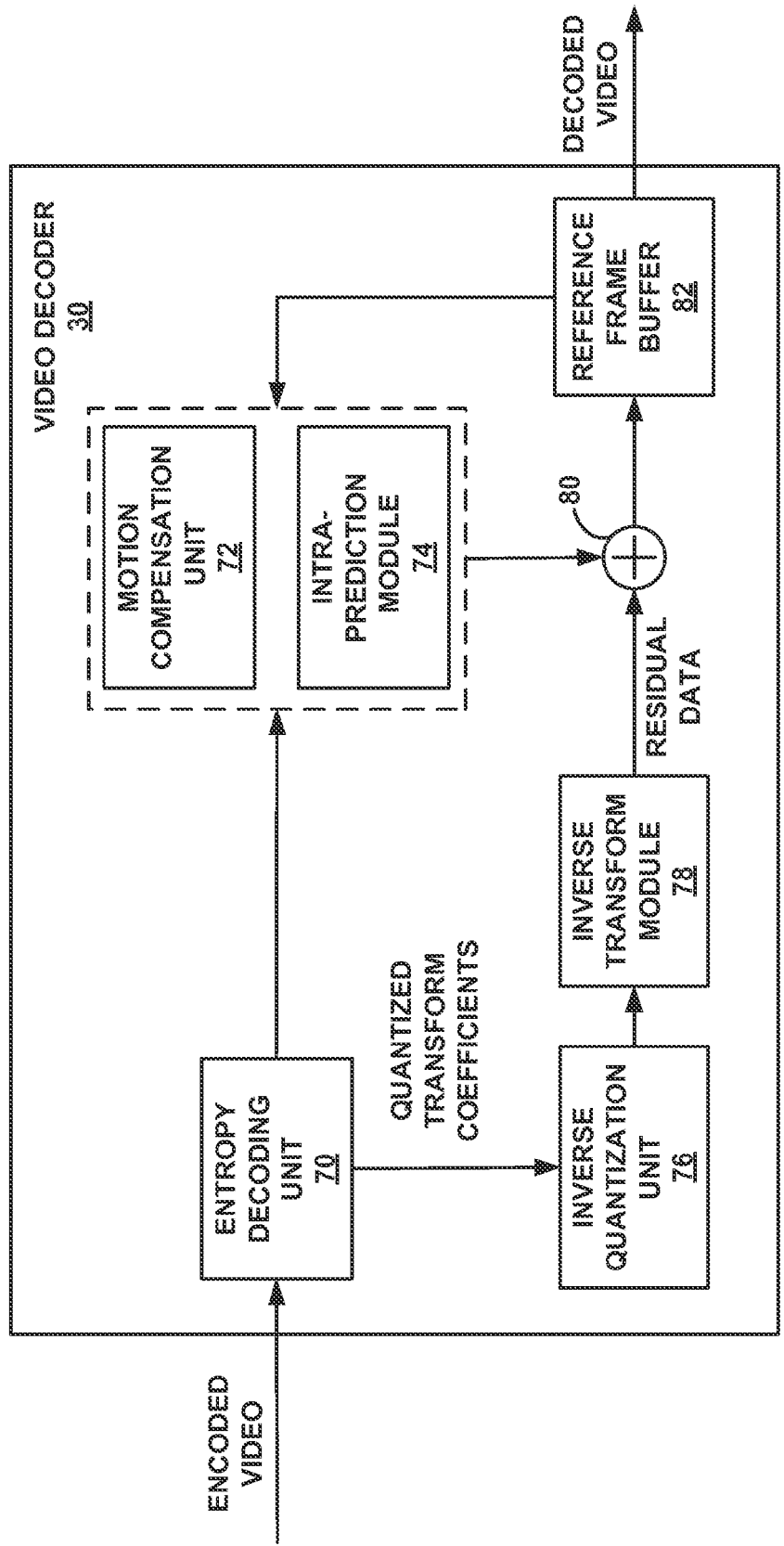
FIG. 7 is a block diagram illustrating an example video decoder.

FIG. 7 is a block diagram illustrating an example of a video decoder 30, which decodes an encoded video sequence. In the example of FIG. 7, the video decoder 30 includes an entropy decoding unit 70, a motion compensation unit 72, an intra-prediction module 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (FIG. 4).

The entropy decoding 70 entropy decodes the encoded video in a process that is the inverse of that used by entropy encoding unit 56 of FIG. 4. The motion compensation unit 72 may generate prediction data based on motion vectors received from the entropy decoding unit 70. The intra-prediction module 74 may generate prediction data for a current block of a current frame based on a signaled intra-prediction mode and data from previously decoded blocks of the current frame.

In some examples, the entropy decoding unit 70 (or the inverse quantization unit 76) may scan the received values using a scan mirroring the scan order used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The video decoder 30 may receive, from encoded bitstream, signaling that identifies the scan order used by the video encoder 20. Additionally, or alternatively, the scan order may be inferred by the video decoder 30 based on characteristics of the coded video such as prediction mode, block size, transform, or other characteristics. As another example, the video encoder 20 and the video decoder 30 may use predetermined scan orders and contexts for all use cases, and as such, no signaling in the encoded bitstream would be needed. The video coder 30 may also receive signaling in the encoded video bitstream that indicates the number of frequency zones to use for the 2D array of residual transform coefficients. In addition, the video decoder 30 may also receive signaling in the encoded video bitstream that, indicates the shape and boundary of the frequency zones. In other examples, the number of zones and the shape and boundary of the zones may be inferred as described above.

Figure 8:
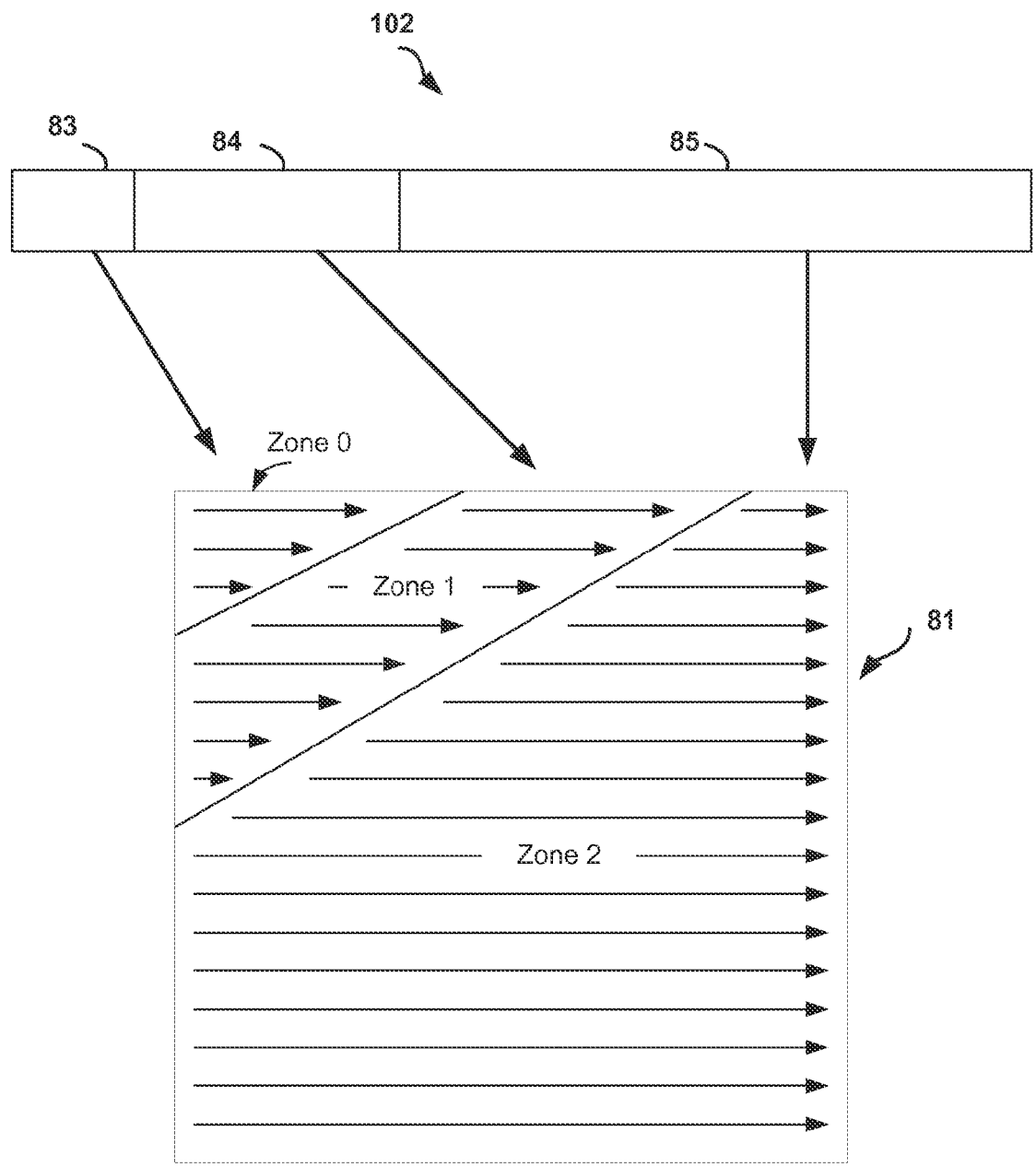
FIG. 8 is a conceptual diagram illustrating a multiple zone scanning process used in video decoding.

No matter how the scan order is determined, the entropy decoding unit 70 uses the inverse of the scan order to scan the 1D vector into the 2D array. In accordance with techniques of this disclosure, the entropy decoding unit 70 may perform a scanning process that scans transform coefficients from sections of the 1D vector into multiple frequency zones of a 2D array. This process may be the inverse of the process described above with reference to FIGS. 5 and 6. FIG. 8 shows one example where transform coefficients in a 1D vector 102 are scanned into a block of transform coefficients 81. A first section of transform coefficients 83 is scanned into a zone 0 of block 81 using a horizontal scanning order. Likewise, a second section of transform coefficients 84 is scanned into a zone 1 of block 81, and a third section of transform coefficients 85 is scanned into a zone 2 of block 81. The scan order used in the decoding process is the same as was used to encode the block.

Figure 9:
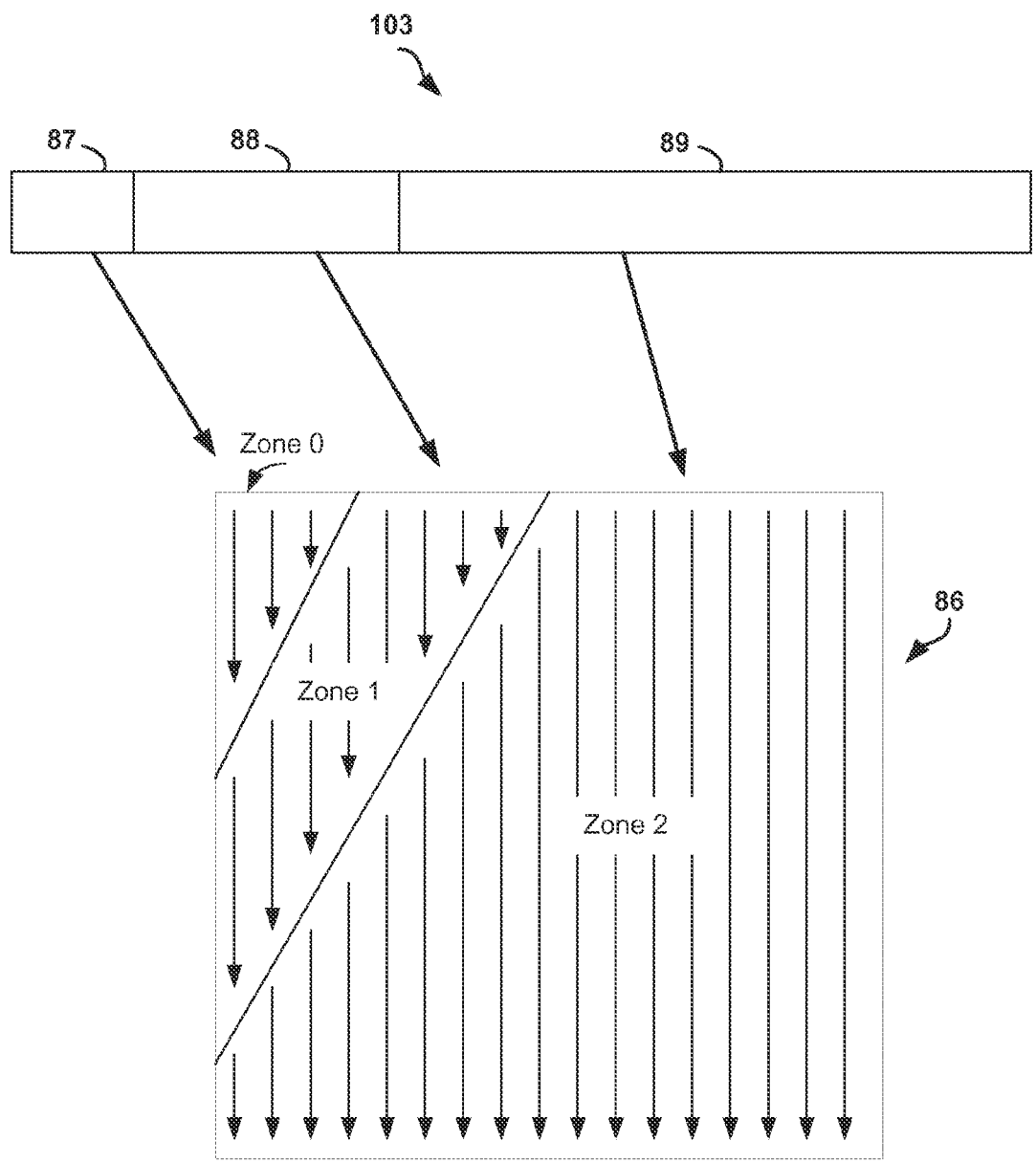
FIG. 9 is another conceptual diagram illustrating a multiple zone scanning process used in video decoding.

FIG. 9 shows a similar example using a vertical scanning order. Transform coefficients in a 1D vector 103 are scanned into a block of transform coefficients 86. A first section of transform coefficients 87 is scanned into a zone 0 of block 86 using a vertical scanning order. Likewise, a second section of transform coefficients 88 is scanned into a zone 1 of block 86, and a third section of transform coefficients 89 is scanned into a zone 2 of block 86.

The 2D array of transform coefficients produced by the entropy decoding unit 70 may be quantized and may generally match the 2D array of transform coefficients scanned by the entropy encoding unit 56 of the video encoder 20 to produce the 1D vector of transform coefficients.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a 1D vector to a 2D array.

The inverse transform module 58 applies an inverse transform, e.g., an inverse DCT, an inverse integer transform, an inverse KLT, an inverse rotational transform, an inverse directional transform, or another inverse transform. In some examples, the inverse transform module 78 may determine an inverse transform based on signaling from the video encoder 20, or by inferring the transform from one or more coding characteristics such as block size, coding mode, or the like. In some examples, the inverse transform module 78 may determine a transform to apply to the current block based on a signaled transform at the root node of a quadtree for an LCU including the current block. In some examples, the inverse transform module 78 may apply a cascaded inverse transform.

The motion compensation unit 72 produces motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

The motion compensation unit 72 and the intra-prediction module 74, in an HEVC example, may use some of the syntax information (e.g., provided by a quadtree) to determine sizes of LCUs used to encode frame(s) of the encoded video sequence. The motion compensation unit 72 and the intra-prediction module 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction module 74 to form decoded blocks. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 3).

Figure 10:
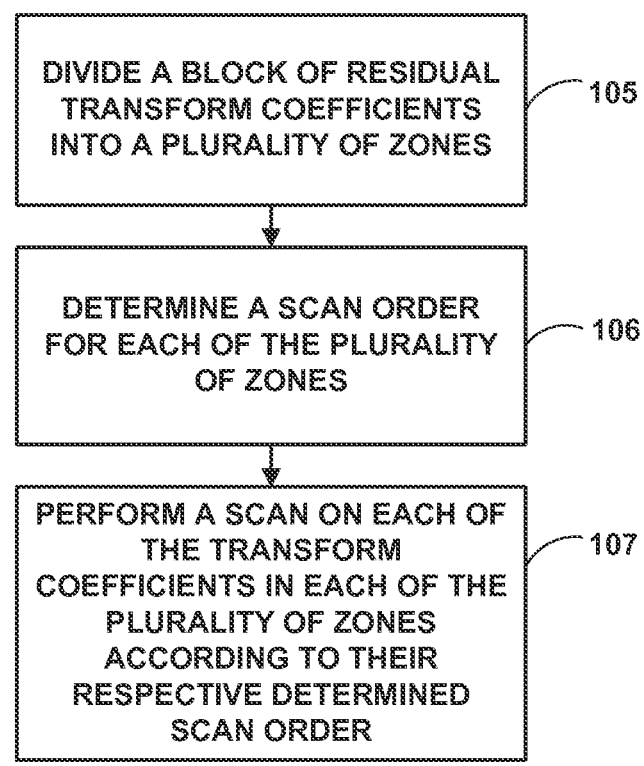
FIG. 10 is a flowchart illustrating an example video encoding process.

FIG. 10 is a flowchart illustrating an example video encoding process for encoding residual transform coefficients. This method may be performed by video encoder 20 of FIG. 3. Video encoder 20 may be configured to divide a block of residual transform coefficients into a plurality of zones (105), determine a scan order for each of the plurality of zones (106), and performing a scan on each of the transform coefficients in each of the plurality of zones according to their respective determined scan order (107), thereby producing a one-dimensional array of residual transform coefficients.

In one example, the determined scan order for one zone of the plurality of zones is different than the determined scan order for the other zones of the plurality of zones. In another example, the determined scan order is the same for each zone of the plurality of zones.

In one example, the scan is a significance map scan in a CABAC process. In another example, the scan is a level coding scan in a CABAC process.

The step 105 of dividing the block of residual transform coefficients into a plurality of zones may comprise dividing the block of residual transform coefficients into a plurality of zones based on a block size, a prediction mode, or motion information. The plurality of zones may take any shape. In one example, at least one of the plurality of zones has a triangular shape defined by a boundary line, the boundary line having an intersection to a top line of the block of residual transform coefficients and the boundary line forming an angle relative to the top line of the block of residual transform coefficients.

In one example of zones with triangular shapes, dividing the block of residual transform coefficients into a plurality of zones may comprise dividing the block of residual transform coefficients into a first zone, a second zone, and a third zone. In the case that the determined scan order for the first zone is a horizontal scan order, the first zone has a first boundary line having an intersection to the top line of the block of residual transform coefficients defined by a maximum of 6 or (W/4+2) where W is the width of the block of residual transform coefficients, the second zone has a second boundary line having an intersection to the top line of the block of residual transform coefficients defined by a minimum of (W/2+4) or W, and the first boundary line and the second boundary line form a 30° angle relative to the top line of the block of residual transform coefficients.

In the case that the determined scan order for the first zone is a vertical scan order, the first zone has a first boundary line having an intersection to the top line of the block of residual transform coefficients defined by a maximum of 6 or (H/4+2) where H is the height of the block of residual transform coefficients, the second zone has a second boundary line having an intersection to the top line of the block of residual transform coefficients defined by a minimum of (H/2+4) or H, and the first boundary line and the second boundary line form a 60° angle relative to the top line of the block of residual transform coefficients.

Figure 11:
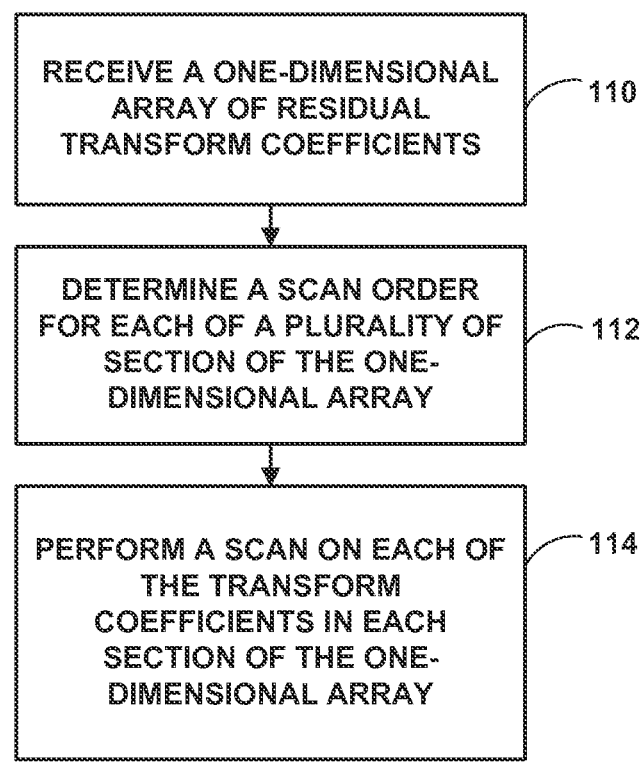
FIG. 11 is a flowchart illustrating an example video decoding process.

FIG. 11 is a flowchart illustrating an example video decoding process. The method of FIG. 11 may be performed by video decoder 30 of FIG. 3, Video decoder 30 may be configured to receive a one-dimensional array of residual transform coefficients (110), determine a scan order for each of a plurality of sections of the one-dimensional array (112), wherein each section of the one-dimensional array corresponds to one of a plurality of zones defining a block of residual transform coefficients, and perform a scan on each of the transform coefficients in each section of the one dimensional array according to their respective determined scan order (114), thereby producing the block of residual transform coefficients.

In one or more examples, the functions described in this disclosure may be implemented in hardware, software, firmware, or any combination thereof. If implemented in software, the functions may be performed by a hardware-based processing unit, such as one or more processors, that execute the software in the form of computer-readable instructions or code. Such instructions or code may be stored on or transmitted over a computer-readable medium and executed by a hardware-based processing unit. Computer-readable media may include computer-readable storage media, which corresponds to a tangible, non-transitory medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure, A computer program product may include a computer-readable medium.

By way of example, and not limitation, such computer-readable storage media can comprise RAM, ROM, EEPROM, Flash memory, CD-ROM or any other solid state, optical or magnetic data storage media, including optical disk storage, magnetic disk storage, or other magnetic storage devices, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that tangible computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be performed by a wide variety of devices or apparatuses, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. In addition, such techniques may be implemented by an integrated circuit (IC) or a set of ICs (e.g., a chip set). A device configured to perform the techniques of the this disclosure may include any of the devices mentioned above and, in some cases, may be a video encoder or video decoder, or combined video encoder-decoder, i.e., a video CODEC, which may be formed by a combination of hardware, software, and firmware. Various components, modules, or units may be described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding transform coefficients in a video encoding process, the method comprising:
    determining a scan order for each of a first zone of a block of transform coefficients, a second zone of the block of transform coefficients, and a third zone of the block of transform coefficients;
    in case the determined scan order for the first zone is a horizontal scan order:
        dividing the block of transform coefficients into the first zone having a first boundary line having an intersection to the top line of the block of transform coefficients defined by a maximum of 6 or (W/4+2) where W is the width of the block of transform coefficients, and
        dividing the block of transform coefficients into the second zone having a second boundary line having an intersection to the top line of the block of transform coefficients defined by a minimum of (W/2+4) or W, the first boundary line and the second boundary line forming a 30° angle relative to the top line of the block of transform coefficients, and
    in case the determined scan order for the first zone is a vertical scan order:
        dividing the block of transform coefficients into the first zone having a third boundary line having an intersection to the top line of the block of transform coefficients defined by a maximum of 6 or (H/4+2) where H is the height of the block of transform coefficients, and
        dividing the block of transform coefficients into the second zone having a fourth boundary line having an intersection to the top line of the block of transform coefficients defined by a minimum of (H/2+4) or H, the first boundary line and the second boundary line forming a 60° angle relative to the top line of the block of transform coefficients; and
    performing a scan on each of the transform coefficients in each of the first zone, the second zone, and the third zone according to their respective determined scan order to produce a one-dimensional array of transform coefficients.

2. The method of claim 1, wherein determining the scan order comprises determining the scan order for one zone of the first zone, the second zone, or the third zone that is different than the determined scan order for the other zones of the first zone, the second zone, or the third zone.

3. The method of claim 1, wherein determining the scan order comprises determining the scan order that is the same for each of the first zone, the second zone, and the third zone.

4. The method of claim 1, wherein performing the scan comprises performing a significance map scan in a context adaptive binary arithmetic coding (CABAC) process.

5. The method of claim 1, wherein dividing the block of transform coefficients into the first zone, the second zone, and the third zone comprises dividing the block of transform coefficients into the first zone, the second zone, and the third zone based on at least one of a block size, a prediction mode, or motion information.

6. The method of claim 1, wherein the scan order is one of a forward horizontal scan, a forward vertical scan, a forward diagonal scan, an inverse horizontal scan, an inverse vertical scan, or an inverse diagonal scan.

7. The method of claim 1,
    wherein determining the scan order comprises determining the scan order with a video encoder,
    wherein dividing the block of transform coefficients comprises dividing the block of transform coefficients with the video encoder, and
    wherein performing the scan comprises performing the scan with the video encoder.

8. The method of claim 1,
    wherein determining the scan order comprises determining the scan order with a means for determining the scan order,
    wherein dividing the block of transform coefficients comprises dividing the block of transform coefficients with a means for dividing the block of transform coefficients, and
    wherein performing the scan comprises performing the scan with a means for performing the scan.

9. The method of claim 1,
    wherein determining the scan order comprises executing, by one or more processors of a device for encoding video data, instructions stored on a non-transitory computer-readable storage medium that cause the one or more processors to determine the scan order,
    wherein dividing the block of transform coefficients comprises executing, by the one or more processors of the device for encoding video data, instructions stored on the non-transitory computer-readable storage medium that cause the one or more processors to divide the block of transform coefficients, and
    wherein performing the scan comprises executing, by the one or more processors of the device for encoding video data, instructions stored on the non-transitory computer-readable storage medium that cause the one or more processors to perform the scan.

10. A method for decoding transform coefficients in a video decoding process, the method comprising:
receiving a one-dimensional array of transform coefficients;
determining a scan order for each of a first section, a second section, and a third section of the one-dimensional array, wherein each section of the one-dimensional array corresponds to one of a plurality of zones defining a block of transform coefficients;
in case the determined scan order for the first section is a horizontal scan order:
dividing the block of transform coefficients into a first zone having a first boundary line having an intersection to the top line of the block of transform coefficients defined by a maximum of 6 or (W/4+2) where W is the width of the block of transform coefficients, and
dividing the block of transform coefficients into a second zone having a second boundary line having an intersection to the top line of the block of transform coefficients defined by a minimum of (W/2+4) or W, the first boundary line and the second boundary line forming a 30° angle relative to the top line of the block of transform coefficients, and
in case the determined scan order for the first section is a vertical scan order:
dividing the block of transform coefficients into the first zone having a third boundary line having an intersection to the top line of the block of transform coefficients defined by a maximum of 6 or (H/4+2) where H is the height of the block of transform coefficients, and
dividing the block of transform coefficients into the second zone having a fourth boundary line having an intersection to the top line of the block of transform coefficients defined by a minimum of (H/2+4) or H, the first boundary line and the second boundary line forming a 60° angle relative to the top line of the block of transform coefficients; and
performing a scan on each of the transform coefficients in each section of the one dimensional array according to their respective determined scan order to produce the block of transform coefficients.

11. The method of claim 10, wherein determining the scan order comprises determining the scan order for one section of the first section, the second section, or the third section that is different than the determined scan order for the other sections of the first section, the second section, or the third section.

12. The method of claim 10, wherein determining the scan order comprises determining the scan order that is the same for each of the first section, the second section, and the third section.

13. The method of claim 10, wherein performing the scan comprises performing a significance map scan in a context adaptive binary arithmetic coding (CABAC) process.

14. The method of claim 10, wherein the plurality of zones of the block of transform coefficients are based on a block size, a prediction mode, or motion information.

15. The method of claim 10, wherein the scan order is one of a forward horizontal scan, a forward vertical scan, a forward diagonal scan, an inverse horizontal scan, an inverse vertical scan, or an inverse diagonal scan.

16. The method of claim 10,
wherein receiving the one-dimensional array comprises receiving the one-dimensional array with a video decoder,
wherein determining the scan order comprises determining the scan order with the video decoder,
wherein dividing the block of transform coefficients comprises dividing the block of transform coefficients with the video decoder, and
wherein performing the scan comprises performing the scan with the video decoder.

17. The method of claim 10,
wherein receiving the one-dimensional array comprises receiving the one-dimensional array with a means for receiving the one-dimensional array,
wherein determining the scan order comprises determining the scan order with a means for determining the scan order,
wherein dividing the block of transform coefficients comprises dividing the block of transform coefficients with a means for dividing the block of transform coefficients, and
wherein performing the scan comprises performing the scan with a means for performing the scan.

18. The method of claim 10,
wherein receiving the one-dimensional array comprises executing, by one or more processors of a device for decoding video data, instructions stored on a non-transitory computer-readable storage medium that cause the one or more processors to receive the one-dimensional array,
wherein determining the scan order comprises executing, by the one or more processors of the device for decoding video data, instructions stored on the non-transitory computer-readable storage medium that cause the one or more processors to determine the scan order,
wherein dividing the block of transform coefficients comprises executing, by the one or more processors of the device for decoding video data, instructions stored on the non-transitory computer-readable storage medium that cause the one or more processors to divide the block of transform coefficients, and
wherein performing the scan comprises executing, by the one or more processors of the device for decoding video data, instructions stored on the non-transitory computer-readable storage medium that cause the one or more processors to perform the scan.

19. An apparatus configured to encode transform coefficients in a video encoding process, the apparatus comprising:
a memory configured to store a block of transform coefficients; and
a video encoder in communication with the memory, the video encoder configured to:
determine a scan order for each of a first zone of a block of transform coefficients, a second zone of the block of transform coefficients, and a third zone of the block of transform coefficients;
divide the block of transform coefficients into the first zone, the second zone, and the third zone,
wherein in case the determined scan order for the first zone is a horizontal scan order, the video encoder is configured to:
divide the block of transform coefficients into the first zone having a first boundary line having an intersection to the top line of the block of transform coefficients defined by a maximum of 6 or (W/4+2) where W is the width of the block of transform coefficients, and divide the block of transform coefficients into the second zone having a second boundary line having an intersection to the top line of the block of transform coefficients defined by a minimum of (W/2+4) or W, wherein the first boundary line and the second boundary line form a 30° angle relative to the top line of the block of transform coefficients, and wherein in case the determined scan order for the first zone is a vertical scan order, the video encoder is configured to:

divide the block of transform coefficients into the first zone having a third boundary line having an intersection to the top line of the block of transform coefficients defined by a maximum of 6 or (H/4+2) where H is the height of the block of transform coefficients, and divide the block of transform coefficients into the second zone having a fourth boundary line having an intersection to the top line of the block of transform coefficients defined by a minimum of (H/2+4) or H, wherein the first boundary line and the second boundary line form a 60° angle relative to the top line of the block of transform coefficients; and perform a scan on each of the transform coefficients in each of the first zone, the second zone, and the third zone according to their respective determined scan order to produce a one-dimensional array of transform coefficients.

20. The apparatus of claim 19, wherein the video encoder is configured to determine the scan order for one zone of the first zone, the second zone, or the third zone that is different than the determined scan order for the other zones of the first zone, the second zone, or the third zone.

21. The apparatus of claim 19, wherein the video encoder is configured to determine the scan order that is the same for each of the first zone, the second zone, and the third zone.

22. The apparatus of claim 19, wherein the video encoder is configured to perform a significance map scan in a context adaptive binary arithmetic coding (CABAC) process.

23. The apparatus of claim 19, wherein the video encoder is further configured to divide the block of transform coefficients into the first zone, the second zone, and the third zone based on a block size, a prediction mode, or motion information.

24. The apparatus of claim 19, wherein the scan order is one of a forward horizontal scan, a forward vertical scan, a forward diagonal scan, an inverse horizontal scan, an inverse vertical scan, or an inverse diagonal scan.

25. The apparatus of claim 19, wherein the video encoder is part of a mobile device and comprises one or more processors.

26. An apparatus configured to decode transform coefficients in a video decoding process, the apparatus comprising:

a memory configured to store a one-dimensional array of transform coefficients; and a video decoder in communication with the memory, the video decoder configured to:

receive the one-dimensional array of transform coefficients;

determine a scan order for each of a first section, a second section, and a third section of the one-dimensional array, wherein each section of the one-dimensional array corresponds to one of a plurality of zones defining a block of transform coefficients;

divide the block of transform coefficients into a first zone, a second zone, and a third zone, wherein in case the determined scan order for the first section is a horizontal scan order, the video decoder is configured to:

divide the block of transform coefficients comprises dividing the block of transform coefficients into the first zone having a first boundary line having an intersection to the top line of the block of transform coefficients defined by a maximum of 6 or (W/4+2) where W is the width of the block of transform coefficients, and divide the block of transform coefficients into the second zone having a second boundary line having an intersection to the top line of the block of transform coefficients defined by a minimum of (W/2+4) or W, wherein the first boundary line and the second boundary line form a 30° angle relative to the top line of the block of transform coefficients, and wherein in case the determined scan order for the first section is a vertical scan order, the video decoder is configured to:

divide the block of transform coefficients comprises dividing the block of transform coefficients into the first zone having a third boundary line having an intersection to the top line of the block of transform coefficients defined by a maximum of 6 or (H/4+2) where H is the height of the block of transform coefficients, and divide the block of transform coefficients into the second zone having a fourth boundary line having an intersection to the top line of the block of transform coefficients defined by a minimum of (H/2+4) or H, wherein the first boundary line and the second boundary line form a 60° angle relative to the top line of the block of transform coefficients; and perform a scan on each of the transform coefficients in each section of the one dimensional array according to their respective determined scan order to produce the block of transform coefficients.

27. The apparatus of claim 26, wherein the video decoder is configured to determine the scan order for one section of the first section, the second section, or the third section that is different than the determined scan order for the other sections of the first section, the second section, or the third section.

28. The apparatus of claim 26, wherein the video decoder is configured to determine the scan order that is the same for each of the first section, the second section, and the third section.

29. The apparatus of claim 26, wherein the video decoder is configured to perform a significance map scan in a context adaptive binary arithmetic coding (CABAC) process.

30. The apparatus of claim 26, wherein the plurality of zones of the block of transform coefficients are based on a block size, a prediction mode, or motion information.

31. The apparatus of claim 26, wherein the scan order is one of a forward horizontal scan, a forward vertical scan, a forward diagonal scan, an inverse horizontal scan, an inverse vertical scan, or an inverse diagonal scan.

32. The apparatus of claim 26, wherein the video decoder is part of a mobile device and comprises one or more processors.

33. An apparatus configured to encode transform coefficients in a video encoding process, the apparatus comprising:
- means for determining a scan order for each of a first zone of a block of transform coefficients, a second zone of the block of transform coefficients, and a third zone of the block of transform coefficients;
- means for dividing, in case the determined scan order for the first zone is a horizontal scan order, the block of transform coefficients into the first zone having a first boundary line having an intersection to the top line of the block of transform coefficients defined by a maximum of 6 or (W/4+2) where W is the width of the block of transform coefficients, and
- means for dividing, in case the determined scan order for the first zone is the horizontal scan order, the block of transform coefficients into the second zone having a second boundary line having an intersection to the top line of the block of transform coefficients defined by a minimum of (W/2+4) or W, the first boundary line and the second boundary line forming a 30° angle relative to the top line of the block of transform coefficients, and
- means for dividing, in case the determined scan order for the first zone is a vertical scan order, the block of transform coefficients into the first zone having a third boundary line having an intersection to the top line of the block of transform coefficients defined by a maximum of 6 or (H/4+2) where H is the height of the block of transform coefficients, and
- means for dividing, in case the determined scan order for the first zone is the vertical scan order, the block of transform coefficients into the second zone having a fourth boundary line having an intersection to the top line of the block of transform coefficients defined by a minimum of (H/2+4) or H, the first boundary line and the second boundary line forming a 60° angle relative to the top line of the block of transform coefficients; and
- means for performing a scan on each of the transform coefficients in each of the first zone, the second zone, and the third zone according to their respective determined scan order to produce a one-dimensional array of transform coefficients.

34. An apparatus configured to decode transform coefficients in a video decoding process, the apparatus comprising:
- means for receiving a one-dimensional array of transform coefficients;
- means for determining a scan order for each of a first section, a second section, and a third section of the one-dimensional array, wherein each section of the one-dimensional array corresponds to one of a plurality of zones defining a block of transform coefficients;
- means for dividing, in case the determined scan order for the first section is a horizontal scan order, the block of transform coefficients into a first zone having a first boundary line having an intersection to the top line of the block of transform coefficients defined by a maximum of 6 or (W/4+2) where W is the width of the block of transform coefficients, and
- means for dividing, in case the determined scan order for the first section is the horizontal scan order, the block of transform coefficients into a second zone having a second boundary line having an intersection to the top line of the block of transform coefficients defined by a minimum of (W/2+4) or W, the first boundary line and the second boundary line forming a 30° angle relative to the top line of the block of transform coefficients, and
- means for dividing, in case the determined scan order for the first section is a vertical scan order, the block of transform coefficients into the first zone having a third boundary line having an intersection to the top line of the block of transform coefficients defined by a maximum of 6 or (H/4+2) where H is the height of the block of transform coefficients, and
- means for dividing, in case the determined scan order for the first section is the vertical scan order, the block of transform coefficients into the second zone having a fourth boundary line having an intersection to the top line of the block of transform coefficients defined by a minimum of (H/2+4) or H, the first boundary line and the second boundary line forming a 60° angle relative to the top line of the block of transform coefficients; and
- means for performing a scan on each of the transform coefficients in each section of the one dimensional array according to their respective determined scan order to produce the block of transform coefficients.

35. A non-transitory computer-readable storage medium comprising instructions that, when executed, cause one or more processors of a device for video encoding to:
- determine a scan order for each of a first zone of a block of transform coefficients, a second zone of the block of transform coefficients, and a third zone of the block of transform coefficients;
- divide the block of transform coefficients into the first zone, the second zone, and the third zone,
- wherein in case the determined scan order for the first zone is a horizontal scan order, the instructions further cause the one or more processors to:
  - divide the block of transform coefficients into the first zone having a first boundary line having an intersection to the top line of the block of transform coefficients defined by a maximum of 6 or (W/4+2) where W is the width of the block of transform coefficients, and
  - divide the block of transform coefficients into the second zone having a second boundary line having an intersection to the top line of the block of transform coefficients defined by a minimum of (W/2+4) or W, wherein the first boundary line and the second boundary line form a 30° angle relative to the top line of the block of transform coefficients, and
- wherein in case the determined scan order for the first zone is a vertical scan order, the instructions further cause the one or more processors to:
  - divide the block of transform coefficients into the first zone having a third boundary line having an intersection to the top line of the block of transform coefficients defined by a maximum of 6 or (H/4+2) where H is the height of the block of transform coefficients, and
  - divide the block of transform coefficients into the second zone having a fourth boundary line having an intersection to the top line of the block of transform coefficients defined by a minimum of (H/2+4) or H, wherein the first boundary line and the second boundary line form a 60° angle relative to the top line of the block of transform coefficients; and
- perform a scan on each of the transform coefficients in each of the first zone, the second zone, and the third zone according to their respective determined scan order to produce a one-dimensional array of transform coefficients.

36. A non-transitory computer-readable storage medium comprising instructions that, when executed, cause one or more processors of a device for video decoding to:
receive a one-dimensional array of transform coefficients;
determine a scan order for each of a first section, a second section, and a third section of the one-dimensional array, wherein each section of the one-dimensional array corresponds to one of a plurality of zones defining a block of transform coefficients;
divide the block of transform coefficients into a first zone, a second zone, and a third zone,
wherein in case the determined scan order for the first section is a horizontal scan order, the instructions further cause the one or more processors to:
divide the block of transform coefficients into the first zone having a first boundary line having an intersection to the top line of the block of transform coefficients defined by a maximum of 6 or (W/4+2) where W is the width of the block of transform coefficients, and
divide the block of transform coefficients into the second zone having a second boundary line having an intersection to the top line of the block of transform coefficients defined by a minimum of (W/2+4) or W, wherein the first boundary line and the second boundary line form a 30° angle relative to the top line of the block of transform coefficients, and
wherein in case the determined scan order for the first section is a vertical scan order, the instructions further cause the one or more processors to:
divide the block of transform coefficients into the first zone having a third boundary line having an intersection to the top line of the block of transform coefficients defined by a maximum of 6 or (H/4+2) where H is the height of the block of transform coefficients, and
divide the block of transform coefficients into the second zone having a fourth boundary line having an intersection to the top line of the block of transform coefficients defined by a minimum of (H/2+4) or H, wherein the first boundary line and the second boundary line form a 60° angle relative to the top line of the block of transform coefficients; and
perform a scan on each of the transform coefficients in each section of the one dimensional array according to their respective determined scan order to produce the block of transform coefficients.

37. A system for encoding and decoding video data, the system comprising:
a memory configured to store a block of transform coefficients; and
a video encoder in communication with the memory, the video encoder configured to:
determine a scan order for each of a first zone of a block of transform coefficients, a second zone of the block of transform coefficients, and a third zone of the block of transform coefficients;
divide the block of transform coefficients into the first zone, the second zone, and the third zone,
wherein in case the determined scan order for the first zone is a horizontal scan order, the video encoder is configured to:
divide the block of transform coefficients into the first zone having a first boundary line having an intersection to the top line of the block of transform coefficients defined by a maximum of 6 or (W/4+2) where W is the width of the block of transform coefficients, and
divide the block of transform coefficients into the second zone having a second boundary line having an intersection to the top line of the block of transform coefficients defined by a minimum of (W/2+4) or W, wherein the first boundary line and the second boundary line form a 30° angle relative to the top line of the block of transform coefficients, and
wherein in case the determined scan order for the first zone is a vertical scan order, the video encoder is configured to:
divide the block of transform coefficients into the first zone having a third boundary line having an intersection to the top line of the block of transform coefficients defined by a maximum of 6 or (H/4+2) where H is the height of the block of transform coefficients, and
divide the block of transform coefficients into the second zone having a fourth boundary line having an intersection to the top line of the block of transform coefficients defined by a minimum of (H/2+4) or H, wherein the first boundary line and the second boundary line form a 60° angle relative to the top line of the block of transform coefficients; and
perform a scan on each of the transform coefficients in each of the first zone, the second zone, and the third zone according to their respective determined scan order to produce a one-dimensional array of transform coefficients; and
a video decoder in communication with the memory, the video decoder configured to:
receive a one-dimensional array of transform coefficients;
determine a scan order for each of a first section, a second section, and a third section of the one-dimensional array, wherein each section of the one-dimensional array corresponds to one of the plurality of zones defining the block of transform coefficients;
divide the block of transform coefficients into the first zone, the second zone, and the third zone,
wherein in case the determined scan order for the first section is the horizontal scan order, the video decoder is configured to:
divide the block of transform coefficients comprises dividing the block of transform coefficients into the first zone having the first boundary line having an intersection to the top line of the block of transform coefficients defined by a maximum of 6 or (W/4+2) where W is the width of the block of transform coefficients, and
divide the block of transform coefficients into the second zone having the second boundary line having an intersection to the top line of the block of transform coefficients defined by a minimum of (W/2+4) or W, wherein the first boundary line and the second boundary line form a 30° angle relative to the top line of the block of transform coefficients, and
wherein in case the determined scan order for the first section is the vertical scan order, the video decoder is configured to:

divide the block of transform coefficients comprises
dividing the block of transform coefficients into
the first zone having the third boundary line having an intersection to the top line of the block of
transform coefficients defined by a maximum of 6
or (H/4+2) where H is the height of the block of
transform coefficients, and divide the block of transform coefficients into the
second zone having the fourth boundary line having an intersection to the top line of the block of
transform coefficients defined by a minimum of
(H/2+4) or H, wherein the first boundary line and
the second boundary line form a 60° angle relative
to the top line of the block of transform coefficients; and perform a scan on each of the transform coefficients in
each section of the one dimensional array according
to their respective determined scan order to produce
the block of transform coefficients.

38. A method, comprising:
encoding, comprising:
determining a scan order for each of a first zone of a
block of transform coefficients, a second zone of the
block of transform coefficients, and a third zone of
the block of transform coefficients;

in case the determined scan order for the first zone is a
horizontal scan order:
dividing the block of transform coefficients into the
first zone having a first boundary line having an
intersection to the top line of the block of transform coefficients defined by a maximum of 6 or
(W/4+2) where W is the width of the block of
transform coefficients, and dividing the block of transform coefficients into the
second zone having a second boundary line having
an intersection to the top line of the block of
transform coefficients defined by a minimum of
(W/2+4) or W, the first boundary line and the
second boundary line forming a 30° angle relative
to the top line of the block of transform coefficients, and in case the determined scan order for the first zone is a
vertical scan order:
dividing the block of transform coefficients into the
first zone having a third boundary line having an
intersection to the top line of the block of transform coefficients defined by a maximum of 6 or
(H/4+2) where H is the height of the block of
transform coefficients, and dividing the block of transform coefficients into the
second zone having a fourth boundary line having
an intersection to the top line of the block of
transform coefficients defined by a minimum of
(H/2+4) or H, the first boundary line and the
second boundary line forming a 60° angle relative
to the top line of the block of transform coefficients; and performing a scan on each of the transform coefficients
in each of the first zone, the second zone, and the
third zone according to their respective determined
scan order to produce a one-dimensional array of
transform coefficients; and decoding, comprising:
receiving the one-dimensional array of transform coefficients;

determining a scan order for each of a first section, a
second section, and a third section of the received
one-dimensional array, wherein each section of the
received one-dimensional array corresponds to one
of a plurality of zones defining a block of transform
coefficients;

in case the determined scan order for the first section of
the received one-dimensional array is a horizontal
scan order:
dividing the block of received transform coefficients
into a first zone having a first boundary line having
an intersection to the top line of the block of
received transform coefficients defined by a maximum of 6 or (W/4+2) where W is the width of the
block of received transform coefficients, and dividing the block of received transform coefficients
into a second zone having a second boundary line
having an intersection to the top line of the block
of received transform coefficients defined by a
minimum of (W/2+4) or W, the first boundary line
and the second boundary line forming a 30° angle
relative to the top line of the block of received
transform coefficients, and in case the determined scan order for the first section of
the received one-dimensional array is a vertical scan
order:
dividing the block of received transform coefficients
into the first zone having a third boundary line
having an intersection to the top line of the block
of received transform coefficients defined by a
maximum of 6 or (H/4+2) where H is the height of
the block of received transform coefficients, and dividing the block of received transform coefficients
into the second zone having a fourth boundary line
having an intersection to the top line of the block
of received transform coefficients defined by a
minimum of (H/2+4) or H, the first boundary line
and the second boundary line forming a 60° angle
relative to the top line of the block of received
transform coefficients; and performing a scan on each of the received transform
coefficients in each section of the one dimensional
array of received transform coefficients according to
their respective
determined scan order to produce the block of transform coefficients.

* * * * *